United States Patent Office 3,437,691
Patented Apr. 8, 1969

3,437,691
(β-HYDROXY-ω-PHENOXYALKYL) GUANIDINE COMPOUNDS
Herman E. Faith, Indianapolis, Ind., assignor to The Dow Chemical Company, Midland, Mich., a corporation of Delaware
No Drawing. Continuation-in-part of application Ser. No. 629,416, Apr. 10, 1967. This application June 2, 1967, Ser. No. 643,032
Int. Cl. C07c *129/08, 93/06;* A61k *27/00*
U.S. Cl. 260—564                                7 Claims

ABSTRACT OF THE DISCLOSURE (β-Hydroxy-ω-phenoxyalkyl)guanidine compounds of the formula

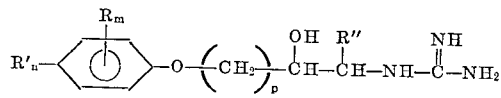

and their pharmaceutically acceptable acid addition salts are useful as agents to control the behavior of animals and are especially useful as hypotensive agents. In the foregoing formula, R represents methyl, methoxy, bromo, or chloro; R' represents R, amino, or hydroxy; R'' represents hydrogen or methyl; $p$ represents an integer of from 1 to 4, $m$ represents an integer of from 0 to 3, $n$ represents an integer of from 0 to 1, and the sum of $m$ and $n$ is an integer of from 0 to 3.

Starting materials and by-products of the formula

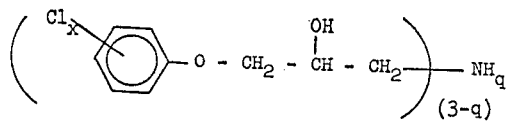

wherein $q$ represents 1 or 2 can also be employed as agents to control the behavior of animals and are useful to control the growth of plants, especially bacteria and fungi.

Cross-reference to related application

This application is a continuation-in-part of application Ser. No. 629,416, filed Apr. 10, 1967 and now abandoned for (β-Hydroxy-ω-Phenoxyalkyl)Guanidine Compounds.

Detailed description of the invention

As set forth hereinabove, the present invention is directed to (β-hydroxy-ω-phenoxyalkyl)guanidine compounds of the formula

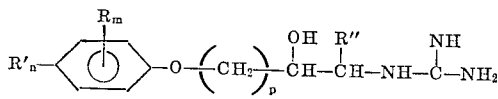

and their pharmaceutically acceptable acid addition salts. In the foregoing and following formulae, R represents methyl, methoxy, bromo, or chloro; R' represents R, amino, or hydroxy; R'' represents hydrogen or methyl; $p$ represents an integer of from 1 to 4, both inclusive; $m$ represents an integer of from 0 to 3, both inclusive; $n$ represents an integer of from 0 to 1, both inclusive; and the sum of $m$ and $n$ is an integer of from 0 to 3, both inclusive.

The products of the present invention are typically crystalline solids. They are prepared by reaction of a (β-hydroxy-ω-phenoxyalkyl)amine of the formula

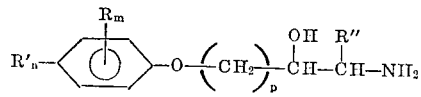

with 2-methylpseudothiourea, a compound of the following formula:

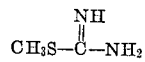

The 2-methylpseudothiourea can be employed, in fact is preferably employed, as a pharmaceutically acceptable acid addition salt; in this instance, the resulting product of the present invention is obtained as the salt of the same pharmaceutically acceptable acid. Most conveniently, if the 2-methylpseudothiourea is employed in a salt form, the sulfate or hemisulfate is used.

The reaction of (β-hydroxy-ω-phenoxyalkyl)amine and 2-methylpseudothiourea is conveniently carried out in an inert liquid reaction medium; suitable such media include hydrocarbons and the lower alkanols. The amounts of the reactants employed are not critical, some of the desired product being obtained when employing the reactants in any amount. However, the reaction consumes the reactants in amounts representing equimolecular proportions, and the use of such amounts is preferred for the most efficient usage of starting materials. The reaction takes place under a wide range of temperatures, such as from 0° C. to the reflux temperature of the liquid reaction medium selected. When a salt of 2-methylpseudothiourea is used, the reaction is preferably carried out at reflux. When 2-methylpseudothiourea, itself, is used, lower temperatures within the range, such as room temperatures, are preferred.

The reaction goes forward readily upon the contacting of the reactants in the reaction temperature range, with the production of the desired product and of methanethiol byproduct. However, higher yields are obtained when the reaction mixture is permitted to stand for a period of time, essentially until the evolution of methanethiol has ceased or markedly diminished. The product is separated from the reaction mixture in conventional procedures. Most typically, the product is a crystalline solid, and can conveniently be separated by filtration or decantation. If desired, the separated product can be purified, similarly in conventional procedures and most frequently by recrystallization.

When the product obtained as a result of the reaction is in the form of a salt, such salt can be converted, by reaction with a base, into the corresponding free base product. Such free base product can then be reacted with a pharmaceutically acceptable acid to obtain the corresponding pharmaceutically acceptable acid addition salt product. The ratio of acid to free base in a salt product is not critical. Ratios of 2:1 or 1:1 (free base:acid) are common and preferred.

In an alternate procedure, the products of the present invention can be prepared by the reaction of the (β-hydroxy - ω - phenoxyalkyl)amine compound, as defined hereinabove, with cyanamide or dicyandiamide, which substances have the following respective formulae:

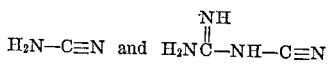

This reaction results in the preparation of the product of the present invention in the free base form. As noted above, the salt form can be obtained by reaction of the free base with a pharmaceutically acceptable acid.

In this alternate method, good results are obtained when employing the reactants in amounts representing equimolecular proportions, when employing an inert liquid reaction medium of the sort above described, and when conducting the reaction at reflux. Separation and purification are carried out as hereinabove described.

The identity of the pharmaceutically acceptable acid is not critical. Representative and suitable such acids include the following: hydrochloric acid, hydrobromic acid, hydriodic acid, sulfuric acid, acetic acid, salicylic acid, valeric acid, oleic acid, benzoic acid, lauric acid, boric acid, lactic acid, nitric acid, phosphoric acid, citric acid, uric acid, succinic acid, tartaric acid, maleic acid, malonic acid, fumaric acid, cinnamic acid, and the like.

The following examples illustrate the best mode for carrying out the present invention and will enable those skilled in the prior art to practice the present invention.

EXAMPLE 1.—[2 - HYDROXY - 3 - (2,6-DICHLOROPHENOXY)PROPYL]-GUANIDINE HEMISULFATE

[2-hydroxy-3-(2,6-dichlorophenoxy)propyl]amine (15 grams; 0.063 mole) and 2-methylpseudothiourea hemisulfate (8.85 grams; 0.063 mole) were mixed together with 40 milliliters of ethanol and the resulting mixture heated to reflux temperature. The reaction mixture was maintained at reflux for 2 hours, then permitted to cool to room temperature and concentrated by removal of ethanol under subatmospheric pressure. The resulting concentrated substance, a syrup, was recrystallized from water. As a result of these operations, there was obtained the desired [2-hydroxy-3-(2,6-dichlorophenoxy)-propyl]guanidine hemisulfate product, a crystalline solid melting, with decomposition, at 209–10° C.

EXAMPLE 2.—[2 - HYDROXY - 3 - (3,4-DICHLOROPHENOXY)PROPYL]-GUANIDINE HEMISULFATE

[2 - hydroxy - 3 - (3,4-dichlorophenoxy)propyl]amine (14.8 grams; 0.063 mole) and 2-methylpseudothiourea hemisulfate (8.8 grams; 0.063 mole) were mixed in 40 milliliters of ethanol. The resulting reaction mixture was heated to reflux temperature and refluxed for 2½ hours. The reaction mixture was then permitted to cool to room temperature; as the cooling took place, the desired [2-hydroxy-3-(3,4-dichlorophenoxy)propyl]guanidine hemisulfate product precipitated in the reaction mixture. It was separated by filtration and recrystallized from water. The product so obtained melted, with decomposition, at 203° C.

Other representative examples prepared in accordance with the procedures reported in Examples 1 and 2 are identified in the following table, in which the symbol "M.P." is employed as an abbreviation of the term "melting point" and the symbol "M.W." is employed as an abbreviation of the term "molecular weight."

EXAMPLES 3–30

From (2-hydroxy-phenoxypropyl)amine and 2-methylpseudothiourea hemisulfate, (2-hydroxy-3-phenoxypropyl)guanidine hemisulfate, a white crystalline product melting at 133–5° C.

From [2 - hydroxy-3-(m-chlorophenoxy)propyl]amine and 2-methylpseudothiourea hemisulfate, [2-hydroxy-3-(m-chlorophenoxy)propyl]guanidine hemisulfate product, M.W. of 292.7.

From [2-hydroxy - 3 - (o-bromophenoxy)propyl]amine and 2-methylpseudothiourea hemisulfate, [2-hydroxy-3-(o-bromophenoxy)propyl]guanidine hemisulfate product, M.W. of 337.2.

From [2 - hydroxy - 3 - (2,6-dichlorophenoxy)-propyl]-amine and 2-methylpseudothiourea hemisulfate, [2-hydroxy-3-(2,6-dichlorophenoxy)propyl]guanidine hemisulfate, a white crystalline product, M.P. 221° C.

From [2 - hydroxy - 3 - (2,5-dichlorophenoxy)propyl]-amine and 2-methylpseudothiourea hemisulfate, [2-hydroxy-3-(2,5-dichlorophenoxy)propyl]guanidine hemisulfate, M.W. of 327.2.

From [2 - hydroxy - 4 - (2,6 - dichlorophenoxy)-butyl]-amine and 2-methylpseudothiourea hemisulfate, [2-hydroxy-4-(2,6-dichlorophenoxy)butyl]guanidine hemisulfate, M.W. of 341.2.

From [2-hydroxy-3-(4-amino-2,6-dihlorophenoxy)propyl]amine and 2-methylpseudothiourea hemisulfate, [2-hydroxy - 3 - (4 - amino-2,6-dichlorophenoxy) - propyl]-guanidine hemisulfate, M.W. of 342.2.

From [2-hydroxy-3-(4-hydroxy-2,6-dichlorophenoxy)propyl]amine and 2-methylpseudothiourea hemisulfate, [2-hydroxy-3-(4-hydroxy-2,6-dichlorophenoxy) - propyl]guanidine hemisulfate, M.W. of 327.2.

From [2-hydroxy - 3 - (2,6-dibromophenoxy)propyl]-amine and 2-methylpsuedothiourea hemisulfate, [2-hydroxy - 3 - (2,6-dibromophenoxy)propyl]guanidine hemisulfate, M.W. of 416.1.

From [2 - hydroxy - 3 - (6-chloro-o-tolyloxy)-propyl]amine and 2-methylpseudothiourea hemisulfate, [2-hydroxy-3-(6 - chloro-o-tolyloxy)propyl]guanidine hemisulfate, a white crystalline product, M.P. 185–6° C.

From [2-hydroxy-3-(4-chloro - 2,6 - xylyloxy)-propyl] amine and 2-methylpseudothiourea hemisulfate, [2-hydroxy-3-(4 - chloro-2,6-xylyloxy)propyl]guanidine hemisulfate, M.W. of 320.8.

From [2 - hydroxy-3-(2,4,6-trichlorophenoxy)-propyl] amine and 2-methylpseudothiourea hemisulfate, [2-hydroxy-3-(2,4,6-trichlorophenoxy)propyl]guanidine hemisulfate, a white crystalline substance, M.P. 215–6° C. (dec.).

From [2 - hydroxy-3-(2,6-dichloro-4-tolyloxy)-propyl] amine and 2-methylpseudothiourea hemisulfate, [2-hydroxy-3-(2,6-dichloro-4-tolyloxy)propyl]guanidine hemisulfate, M.W. of 341.2.

From [2 - hydroxy - 3 - (p - methoxyphenoxy)propyl] amine and 2-methylpseudothiourea hemisulfate, [2-hydroxy-3-(p - methoxyphenoxy)propyl]guanidine hemisulfate, a white crystalline product, M.P. of 158–60° C.

From [2-hydroxy-3-(3,4,5-trimethoxyphenoxy)-propyl] amine and 2-methylpseudothiourea hemisulfate, [2-hydroxy - 3 - (3,4,5 - trimethoxyphenoxy)propyl]guanidine hemisulfate, M.W. of 248.3.

From [2-hydroxy-3-(2,6-xylyloxy)propyl]amine and 2-methylpseudothiourea hemisulfate, [2-hydroxy-3-(2,6-xylyloxy)propyl]guanidine hemisulfate, a white crystalline product, M.P. 182–3° C.

From [2-hydroxy-3-(2,4,6-trimethylphenoxy)-propyl] amine and 2-methylpseudothiourea hemisulfate, [2-hydroxy-3-(2,4,6-trimethylphenoxy)propyl]guanidine hemisulfate, M.W. of 300.3.

From [2-hydroxy - 3 - phenoxy-1-methylpropyl]amine and 2-methylpseudothiourea hemisulfate, [2-hydroxy-3-phenoxy-1-methylpropyl]guanidine hemisulfate, M.W. of 272.3.

From [2-hydroxy-4-phenoxy-1-methylbutyl]amine and 2-methylpseudothiourea hemisulfate, (2-hydroxy-4-phenoxy-1-methylbutyl)guanidine hemisulfate, M.W. of 286.3.

From [2 - hydroxy-4-(2,6-dichlorophenoxy)-1-methylbutyl]amine and 2-methylpseudothiourea hemisulfate, [2 - hydroxy-4-(2,6-dichlorophenoxy) - 1 - methylbutyl] guanidine hemisulfate, M.W. of 355.2.

From [2 - hydroxy-3-(o-chlorophenoxy)propyl]-amine and 2-methylpseudothiourea hemisulfate, [2-hydroxy-3-(o-chlorophenoxy)propyl]guanidine hemisulfate, M.P. 154–6° C.

From [2-hydroxy - 6 - (2,6-dichlorophenoxy)-hexyl] amine and 2-methylpseudothiourea hemisulfate, [2-hydroxy-6-(2,6-dichlorophenoxy)hexyl]guanidine hemisulfatet, M.W. of 369.2.

From (2-hydroxy-5-phenoxypentyl)amine and 2-methylpseudothiourea hemisulfate, 2-hydroxy-5-phenoxypentyl)guanidine hemisulfate, M.W. of 286.3.

From [2-hydroxy-6-(n-tolyloxy)hexyl]amine and 2-methylpseudothiourea hemisulfate, [2-hydroxy-6-(n-tolyloxy)hexyl]guanidine hemisulfate, M.W. of 314.4.

From [2 - hydroxy - 5 - (p-methoxyphenoxy)phentyl) amine and 2-methylpseudothiourea hemisulfate, [2-hydroxy-5-(p - methoxyphenoxy)pentyl]guanidine hemisulfate, M.W. of 316.3.

From [2-hydroxy-5-(4-bromo-o-tolyloxy) - 1 - methylpentyl]amne and 2-methylpseudothiourea hemisulfate, [2-hydroxy - 5 - (4-bromo-o-tolyloxy) - 1 - methylpentyl] guanidine hemisulfate, M.W. of 393.3.

From [2-hydroxy - 6 - (p-aminophenoxy)hexyl]amine and 2-methylpseudothiourea hemisulfate, [2-hydroxy-6-(p-aminophenoxy)hexyl]guanidine hemisulfate, M.W. of of 315.4.

From [2-hydroxy-5-(4-hydroxy-2,6-dichlorophenoxy) pentyl]amine and 2-methylpseudothiourea hemisulfate, [2-hydroxy-5-(4-hydroxy - 2,6 - dichlorophenoxy)-pentyl] guanidine hemisulfate, M.W. of 371.2.

EXAMPLE 31.—[2-HYDROXY-3-(2,6-DICHLOROPHENOXY)PROPYL]-GUANIDINE

An aqueous solution of barium hydroxide is added to a chilled aqueous solution of [2-hydroxy-3-(2,6-dichlorophenoxy)propyl]guanidine hemisulfate prepared as described in Example 1. The barium hydroxide and hemisulfate reactants are employed in equivalent amounts. Addition of the barium hydroxide solution results in the precipitation of barium sulfate, which is removed from the solution by filtration. The solution contains the desired free base, [2-hydroxy - 3 - (2,6-dichlorophenoxy) propyl]guanidine. It has a molecular weight of 278.2.

EXAMPLE 32.—[2-HYDROXY-3-(2,6-DICHLOROPHENOXY)PROPYL]GUANIDINE MALEATE

To the aqueous solution of the free base [2-hydroxy-3-(2,6-dichlorophenoxy)propyl]guanidine prepared as described in Example 31 there is added an equimolecular amount of maleic acid. Thereafter, water is removed by evaporation under subatmospheric pressure to obtain the desired [2 - hydroxy - 3 - (2,6 - dichlorophenoxy)propyl] guanidine maleate, M.W. of 394.

EXAMPLES 33–44

Other salt and free base products of the present invention are similarly prepared. Such other products include the following representatives: [2-hydroxy-3-(o-chlorophenoxy)propyl]guanidine (M.W. of 243.7) and the corresponding hydrochloride (M.W. of 280.2); [2-hydroxy-3 - (6 - chloro - 2 - tolyloxy)propyl]guanidine (M.W. of 257.7) and its citrate (M.W. of 450); [2-hydroxy-3-(2,6-xylyloxy)propyl]guanidine (M.W. of 237.3) and the corresponding nitrate (M.W. of 300.3); [2-hydroxy-3-(2,4,6-trichlorophenoxy)propyl]guanidine (M.W. of 312.6) and the corresponding phosphate (M.W. of 344.6); [2-hydroxy - 3 - (2,6 - dichlorophenoxy) - 1 - methylpropyl] guanidine (M.W. of 293) and the corresponding hydrobromide (M.W. of 373); and [2-hydroxy-3-(2,6-dichlorophenoxy)hexyl]guanidine (M.W. of 320.2) and the corresponding tartrate (M.W. of 470.3).

The products of the present invention are useful for studying and controlling the behavior of animals such as mice, rats, dogs, and monkeys. In particular, the products exhibit adrenergic neuron blocking activity and thus can be employed as hypotensive agents. They can also be used as antidepressants.

[2 - hydroxy - 3 - (2,6 - dichlorophenoxy)propyl] guanidine hemisulfate was evaluated in mice. In this evaluation, each member of a group of mice was injected intraperitoneally with reserpine at the rate of 5 milligrams per kilogram of animal body weight, as a 0.05 percent aqueous solution. Thereafter, the mice were held for a period of about 18 to 24 hours; at this time, the [2-hydroxy-3-(2,6 - dichlorophenoxy)propyl]guanidine was administered, by intraperitoneal injection at the rate of 50 milligrams per kilogram of animal body weight. The mice were thereafter observed for possible reversal of the symptoms of ptosis and depression caused by reserpine administration. It was observed that of 10 mice in the group, reserpine effects in 8 were reversed by administration of the subject compound.

In another evaluation, [2 - hydroxy - 3 - (2,6 - dichlorophenoxy)propyl]guanidine was administered to an anesthetized cat. Anesthesia was induced by intravenous administration of pentobarbital at the rate of 32 milligrams per kilogram of animal body weight. Thereafter, both the pre-ganglionic and post-ganglionic cervical nerves were isolated and bipolar silver electrodes positioned on each. Stimulation of the isolated nerves in the course of the evaluation was at a frequency of 29 pulses/second for two milli-seconds at a voltage of 2 to 4 volts. The nictitating membrane was linked to a force displacement transducer. The [2 - hydroxy - 3 - (2,6 - dichlorophenoxy)propyl]guanidine was administered by intravenous injection, in the amount of 8 milligrams per kilogram of animal body weight. Contraction of the nictitating membrane following each of pre-ganglionic and post-ganglionic stimulation was recorded just prior to administration of the subject compound, immediately after administration of the subject compound, and at 1, 2, 3, and 4 hours following administration of the subject compound. The results are set forth in the following table.

| | Millimeters of contraction | | | | | |
|---|---|---|---|---|---|---|
| | Before administration | Immediately after administration | 1 hour after administration | 2 hours after administration | 3 hours after administration | 4 hours after administration |
| Pre-ganglionic stimualtion | 27 | 29 | 12.5 | 4 | 4 | 2 |
| Post-ganglionic stimulation | 23 | >25 | 14 | 9 | 7 | 5 |

In the employment of the final products of the present invention for studying and controlling the behavior of animals, the unmodified compounds can be used. However, it is generally preferred to employ a composition comprising one or more of the products and one or more adjuvants which are pharmaceutically acceptable and facilitate the administration of the compound. For example, a product can be formulated in water, which can be a physiological saline solution. When a product is to be administered orally, it can be formulated in a tablet, animal feed, capsule, or the like, by techniques known in the art of formulation.

The final products of the present invention, in addition to being useful as agents for studying and controlling the behavior of animals, are useful as agents to control the growth of plants, especially bacteria and fungi. In this embodiment, there is employed one or more of the unmodified compounds, or, preferably, a suitable formulation containing one or more of the compounds and one or more adjuvants, such as surface active dispersing agents, liquid diluents, and the like. In representative operations, [2 - hydroxy - 3 - (6 - chloro - o - tolyloxy)propyl]guanidine hemisulfate was incorporated in a culture medium in the amount of 0.05 percent and the medium inoculated with *Bacillus subtilis*. Observations forty-eight hours later showed complete inhibition of the growth of the organism.

Those compounds to be used as starting materials in the preparation of the products of the present invention, which starting materials are of the following formula:

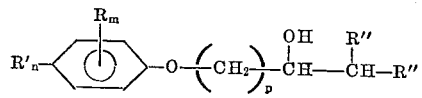

are prepared in known procedures. In these procedures, an epoxy compound of the formula

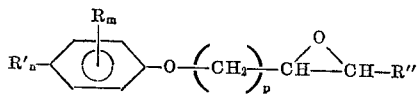

is reacted with ammonia, conveniently supplied as ammonium hydroxide. Good results are obtained when reacting equimolecular proportions of the reactants in a loweralkanol as reaction medium and at reflux temperatures.

A preferred species of the present invention is the group of compounds designated by the following formula

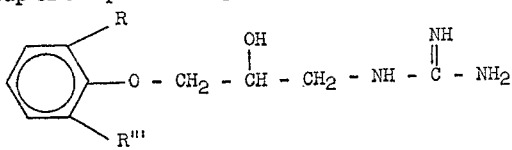

and their pharmaceutically acceptable acid addition salts. R, as previously hereinabove, is employed to designate bromo, chloro, methyl, or methoxy; and R''' designates hydrogen or R. These products exhibit to an enhanced degree the properties and utility exhibited by the products of the present invention, generally, and in addition, they are synthesized from readily available starting materials.

A preferred group of starting materials for the preparation of the products of the present invention are those compounds of the formula

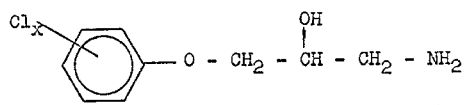

and their pharmaceutically acceptable acid addition salts. In the above and succeeding formulae, $x$ represents an integer of from 2 to 3, both inclusive. Related to these compounds are the corresponding secondary amine compounds of the formula:

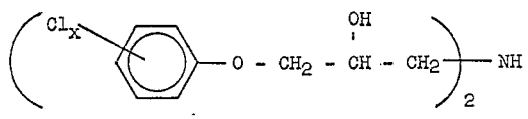

Thus, these starting materials and the corresponding secondary amines, expressed generically, are of the following formula:

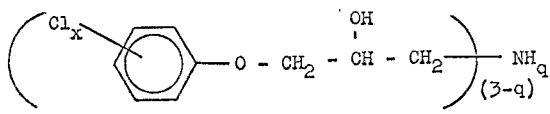

wherein $q$ represents an integer of from 1 to 2, both inclusive. As noted foregoing, these compounds, as the final products of the present invention, can be employed as agents to study and control the behavior of animals; in addition, they are useful as agents to control the growth of plants, particularly fungi and bacteria.

All of these compounds are prepared in a reaction which produces a mixture of both the primary amine starting material and its corresponding secondary amine. This reaction comprises the reaction of a 1,2-epoxy-3-phenoxypropane having the following formula:

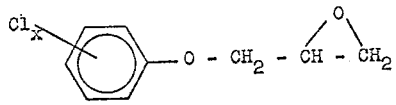

with ammonia, which can be supplied as ammonium hydroxide. The reaction is conveniently carried out in a liquid reaction medium, the water of the ammonium hydroxide reactant typically serving this function. However, other organic solvents can be used and the ammonia bubbled into the reaction mixture. Also, even when the water of ammonium hydroxide serves as reaction medium, other solvents which are water-miscible, such as the loweralkanols, can be used in conjunction with the ammonium hydroxide. The exact amounts of the reactants employed are not critical, some of the desired primary amine product and corresponding secondary amine product being obtained regardless of the amounts. However, although the reactions of 1,2-epoxy-3-phenoxypropane and ammonium hydroxide consume the reactants in stoichiometric amounts, higher yields generally are obtained when employing an excess amount of the ammonium hydroxide. Thus, it is preferred to employ the reactants in amounts representing one molecular proportion of 1,2-epoxy-3-phenoxypropane and from one to ten or more molecular proportions of ammonium hydroxide.

The reaction goes forward readily under a wide range of temperatures, such as from 10 to 100° C.; generally, though, it is preferred to conduct it at temperatures of from 25 to 80° C. As noted, the reaction results in the preparaion of a mixture of the desired primary and secondary amines. They can be removed from the reaction mixture separately, or removed jointly and thereafter separated, in conventional procedures. Most typically, in separating the products, advantage is taken of the different solubilities of the primary and secondary amines in the reaction mixture. The separated products can thereafter be purified, if desired, in conventional procedures.

In carrying out the reaction, the 1,2-epoxy-3-phenoxypropane is reacted with ammonia, conveniently as ammonium hydroxide, and with additional solvent if desired, and the reaction mixture held in the reaction temperature range for a period of time. The secondary amine is typically separated and removed by filtration, and the reaction mixture thereafter subjected to evaporation under subatmospheric pressure to remove solvent and obtain the corresponding primary amine. As the products are typically crystalline solids, purification is readily achieved by recrystallization from suitable solvent.

In the preparation of the pharmaceutically acceptable acid addition salts of the preferred starting materials and corresponding secondary amines, the base is reacted with a pharmaceutically acceptable acid to obtain the corresponding salt product. The ratio of acid to free base in a salt product is not critical. Ratios of 1:1 are common and preferred. Representative pharmaceutically acceptable acids include those identified hereinabove as suitable for salt formation with the final products of the present invention.

The following examples further illustrate embodiments of the present invention in the preferred starting materials and the corresponding secondary amines, and will enable those skilled in the art to practice the same.

EXAMPLE 45.—PREPARATION AND SEPARATION OF [2-HYDROXY-3-(2,4 - DICHLOROPHENOXY) PROPYL]AMINE AND BIS[2-HYDROXY-3-(2,4-DICHLOROPHENOXY)-PROPYL]AMINE 50 grams of 3-(2,4-dichlorophenoxy)-1,2-epoxy-propane (0.228 mole) were added to a solution of 160 milliliters of ethanol and 193 milliliters of 28 percent ammonium hydroxide. The resulting reaction mixture was gradually heated to reflux and refluxed for 15 minutes. The reaction mixture was then cooled to 25° C. and filtered to separate the secondary amine, bis[2-hydroxy-3-(2,4-dichlorophenoxy)propyl]amine, M.P. 124–30° C., in a yield of 24 percent.

Reaction medium was removed from the filtrate by evaporation under subatmospheric pressure and residual water removed by azeotroping with benzene. As a result of these operations, the desired corresponding primary amine, [2-hydroxy - 3 - (2,4 - dichlorophenoxy)propyl]-amine, M.P. 79–80° C., was obtained. The yield was 35 percent.

EXAMPLE 46.—PREPARATION AND SEPARATION OF [2 - HYDROXY - 3 - (2,4,6 - TRICHLOROPHENOXY)PROPYL]AMINE AND BIS[2-HYDROXY-3-(2,4,6-TRICHLOROPHENOXY)-PROPYL]AMINE

3 - (2,4,6 - trichlorophenoxy) - 1,2 epoxypropane (81.5 grams; 0.32 mole) was added to a mixture of 310 milliliters of ethanol and 240 milliliters of 28 percent ammonium hydroxide. The resulting mixture was heated to reflux temperature, refluxed for 15 minutes, and then cooled to room temperature. Cooling of the reaction mixture was accompanied by precipitation therein of a white crystalline substance, the desired secondary amine product, bis-[2-hydroxy-3-(2,4,6 - trichlorophenoxy)propyl]amine. It was separated by filtration and found to melt at 131–8° C. It was obtained in a 25 percent yield.

Thereafter, the filtrate was subjected to evaporation under subatmospheric pressure to obtain the corresponding primary amine, [2 - hydroxy-3-(2,4,6-trichlorophenoxy)-propyl]amine. It was purified by recrystallization from benzene, the purified product melting at 111–2° C. The amount of primary amine obtained represented a 44 percent yield.

EXAMPLE 47.—[2-HYDROXY-3-(2,4-DICHLORO-PHENOXY)PROPYL]AMINE MALEATE

To the aqueous solution of the free base [2-hydroxy-3-(2,4-dichlorophenoxy)propyl]amine prepared as described in Example 45 there is added an equimolecular amount of maleic acid. Thereafter, water is removed by evaporation under subatmospheric pressure to obtain the desired [2-hydroxy - 3 - (2,4 - dichlorophenoxy)propyl]amine maleate, having a molecular weight of 352.2.

EXAMPLES 48–57

Other representative products, prepared in accordance with the foregoing teachings and examples, includes the following: [2 - hydroxy - 3 - (2,3 - dichlorophenoxy)propyl]amine, M.P., 111–2° C.; bis[2-hydroxy-3-(2,3-dichlorophenoxy)propyl]amine, M.P., 126–31° C.; [2-hydroxy - 3 - (2,5 - dichlorophenoxy)propyl]amine, M.P., 123–4° C.; bis[2 - hydroxy - 3 - (2,5 - dichlorophenoxy)-propyl]amine, M.P., 152–8° C.; [2-hydroxy-3-(2,6-dichlorophenoxy)propyl]amine, M.P., 92–3° C.; bis[2-hydroxy - 3 - (2,6 - dichlorophenoxy)propyl]amine, M.P., 132–5° C.; [2 - hydroxy - 3 - (3,4 - dichlorophenoxy)propyl]amine, M.P., 103–6° C.; bis[2 - hydroxy - 3 - (3,4-dichlorophenoxy)propyl]amine, M.P., 131–3° C.; [2-hydroxy - 3 - (2,4,5 - trichlorophenoxy)propyl]amine, M.P., 112–3° C.; and bis[2-hydroxy-3-(2,4,5-trichlorophenoxy)-propyl]amine, M.P., 146–51° C.

EXAMPLES 58–64

Representative salt products include the following, the symbol "M.W." being employed as an abbreviation for the term "molecular weight": [2-hydroxy-3-(2,6-dichlorophenoxy)propyl]amine hydrochloride, M.W. of 272.5; bis[2 - hydroxy-3 - (2,5 - dichlorophenoxy)propyl]amine acetate, M.W., 515.2; [2-hydroxy-3-(2,4,5-trichlorophenoxy)propyl]amine maleate, M.W. of 386.5; bis[2-hydroxy 3-(2,4,6-trichlorophenoxy)propyl]amine hydrobromide, M.W., 605.0; [2 - hydroxy - 3 - (2,4-dichlorophenoxy)propyl]amine nitrate, M.W. of 299; bis[2-hydroxy - 3-(2,4 - dichlorophenoxy)propyl]amine maleate, M.W., 571.3; and [2-hydroxy-3-(3,4-dichlorophenoxy) propyl]amine citrate, M.W. of 428.

The preferred starting materials and corresponding secondary amines, as noted foregoing, are useful as agents to control the growth of plants, particularly bacteria and fungi, such as, for example, *Aerobacter aerogenes, Bacillus subtilis, Pseudomonas aeruginosa, Salmonella typhosa, Staphylococcus aureus, Aspergillus terreus, Candida pelliculosa, Pullularia pullulans,* and *Rhizopus nigricans.* In such application, the unmodified compounds can be used. Preferably, however, compositions comprising the compounds are employed. For example, the compounds can be dispersed on a finely divided solid and employed as dusts. Also, such mixtures can be dispersed in water with the aid of a wetting agent and the resulting aqueous suspensions employed as sprays. In other procedures, the products can be employed as constituents of organic liquid solutions, oil-in-water or water-in-oil emulsions or water dispersions with or without the addition of wetting, dispersing or emulsifying agents.

In representative operations, amounts of bis[2-hydroxy-3-(3,4-dichlorophenoxy)propyl]amine and a standard microbiological culture medium were mixed together to obtain a test medium containing 0.05 percent by weight of the specified compound. This test medium and an unmodified portion of the same standard microbiological culture medium, the latter serving as a control, were inoculated with *Bacillus subtilis,* and the inoculated cultures thereafter held under conditions conductive to their growth. Observations at twenty-four and forty-eight hours following inoculation showed a complete inhibition of the growth of the organism in the test medium, whereas the control medium showed an abundant growth of the organism.

Essentially the same results were obtained with the following compounds:

[2-hydroxy-3-(2,5-dichlorophenoxy)propyl]amine;
[2-hydroxy-3-(2,4-dichlorophenoxy)propyl]amine;
[2-hydroxy-3-(2,3-dichlorophenoxy)propyl]amine;
[2-hydroxy-3-(2,4,5-trichlorophenoxy)propyl]amine; and
[2-hydroxy-3-(2,4,6-trichlorophenoxy)propyl]amine.

I claim:
1. Compound of the formula

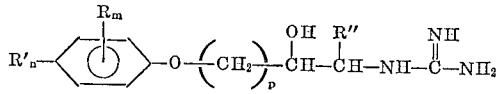

and its pharmaceutically acceptable acid addition salts, wherein R represents methyl, methoxy, bromo, or chloro; R' represents R, amino, or hydroxy; R" represents hydrogen or methyl; p represents an integer of from 1 to 4, both inclusive; m represents an integer of from 0 to 3, both inclusive; n represents an integer of from 0 to 1, both inclusive; and the sum of m and n is an integer of from 0 to 3, both inclusive.

2. The compound of claim 1 which is (1) a compound of the formula

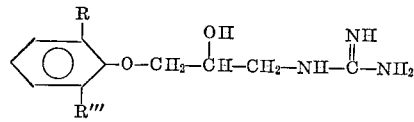

wherein R designates methyl, methoxy, bromo, or chloro, and R''' designates hydrogen or R; or (2) its pharmaceutically acceptable acid addition salts.

3. The compound of claim 2 which is [2-hydroxy-3-(o-chlorophenoxy)propyl]guanidine hemisulfate.

4. The compound of claim 2 which is [2-hydroxy-3-(2,6-dichlorophenoxy)propyl]guanidine hemisulfate.

5. The compound of claim 2 which is [2--hydroxy-3-(2,6-dichlorophenoxy)propyl]guanidine hydrochloride.

6. The compound of claim 2 which is [2-hydroxy-3-(6-chloro-o-tolyloxy)propyl]guanidine hemisulfate.

7. The compound of claim 1 which is [2-hydroxy-4-2,6-dichlorophenoxy)butyl]guanidine hemisulfate.

References Cited

UNITED STATES PATENTS 3,209,023  9/1965  Copp et al. _____ 260—564 X

ROBERT V. HINES, *Primary Examiner.*

U.S. Cl. X.R.

260—348, 551, 570.7, 501.14; 71—103, 121, 122, 124; 424—326